Aug. 29, 1967
P. O. HAIN
3,338,736
PRODUCTION OF COATED PAPER UTILIZING AQUEOUS COATINGS CONTAINING
A MAJOR WEIGHT PROPORTION BASED ON SOLIDS OF HEAT
SOFTENABLE RESIN AND UTILIZING NON-EQUILIBRIUM
MOISTURE CONDITIONS AND SHEARING FORCES
Filed March 31, 1966
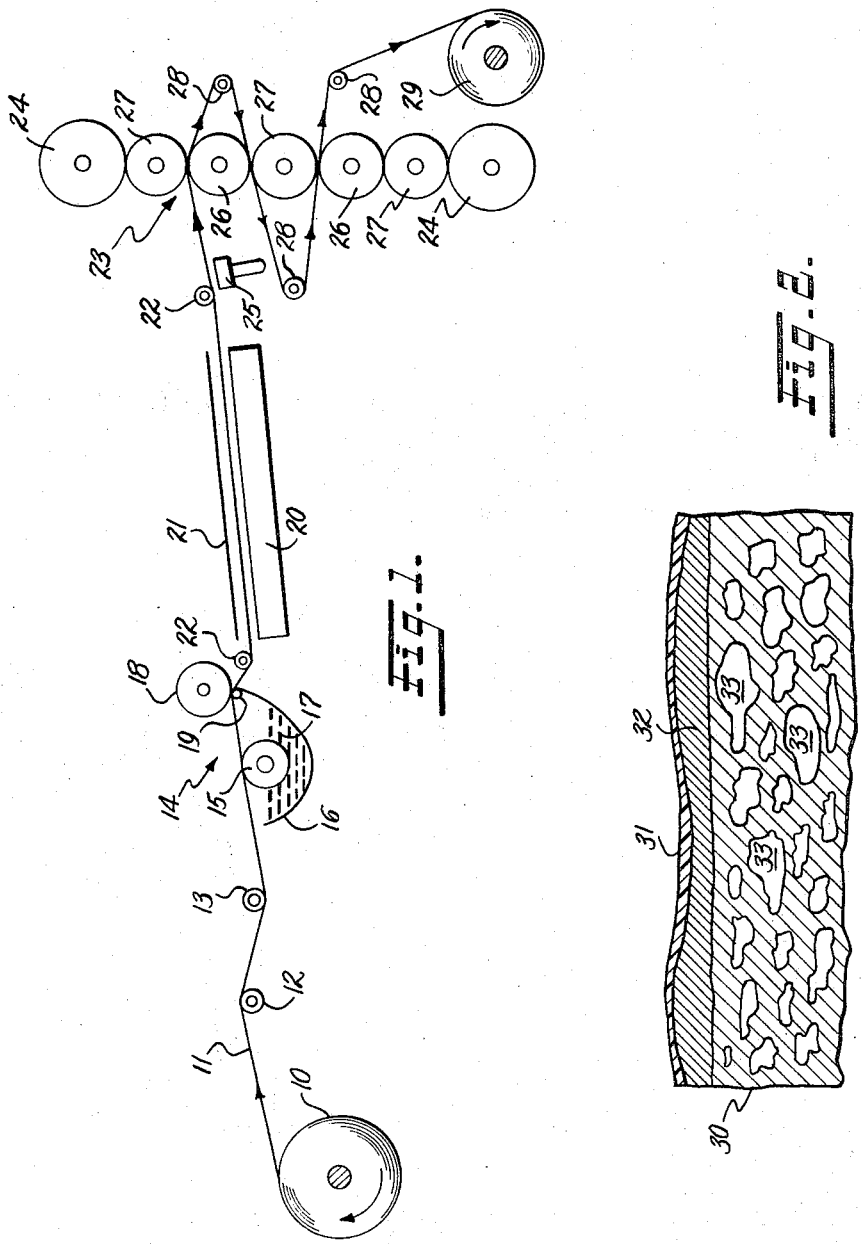
INVENTOR
PAUL O. HAIN
BY Arnold G. Gulko
ATTORNEY United States Patent Office 3,338,736
Patented Aug. 29, 1967

3,338,736
PRODUCTION OF COATED PAPER UTILIZING AQUEOUS COATINGS CONTAINING A MAJOR WEIGHT PROPORTION BASED ON SOLIDS OF HEAT SOFTENABLE RESIN AND UTILIZING NON - EQUILIBRIUM MOISTURE CONDITIONS AND SHEARING FORCES
Paul O. Hain, Hamilton, Ohio, assignor to U.S. Plywood-Champion Papers Inc., a corporation of New York
Filed Mar. 31, 1966, Ser. No. 539,199
17 Claims. (Cl. 117—64)

The present invention relates to the production of coated paper which is adapted to receive printing or which has already been printed or to merely provide a resin coating of remarkably thin and uniform properties and is a continuation-in-part of my copending application Ser. No. 182,024, filed Mar. 23, 1962, now United States Patent No. 3,268,354.

In accordance with the teachings of the said prior application, an aqueous coating composition comprising a major proportion of filler, especially mineral filler, and a minor proportion of non-water absorptive, film-forming, heat softenable resin particles is applied to a surface of a relatively dry fibrous cellulosic paper substrate and the aqueous coating is exposed to heat to dry the exposed surface of the coating until this exposed surface is dry to the touch and the surface of the substrate underlying the coating is sufficiently wet with water as to be permanently pressure deformed. While the coated paper is in the non-equilibrium moisture condition specified, it is passed through the nip between a pair of turning rolls, at least one of which has a heated finishing surface, so that heat, pressure and shearing forces are applied and a print-receptive surface is formed. When materials are selected as indicated and non-equilibrium moisture conditions obtained, as indicated, the turning rolls per the teachings of said application cause the production of a superior levelness in the coated surface of the paper and improved distribution of the coating over the surface of the paper so that coated paper of superior gloss can be produced using less coating material than was formerly required and the coating is more uniformly distributed to provide superior ink-receptivity and improved resistance to blistering in high speed web offset printing.

While the foregoing description is directed to the usual procedure in which the water is supplied by the aqueous coating itself, the said prior application also includes the rewetting of coatings which have been previously applied and dried.

My prior application is limited to the use of a major proportion of filler which minimizes contact between the minor proportion of heat-softenable particles of non-water absorptive resin and the contacting surface of the turning rolls. Prior to the present invention, the utilization of a major proportion of resin particles would tend to cause the coating to stick to the turning rolls which prevents the successful operation of the process. Similarly, and unless the resin particles were selected as aforesaid, this would also tend to cause the coating to stick to the turning rolls, again preventing successful operation of the process. However, and using more sophisticated equipment and control, it has now been found possible to successfully perform the processing steps of my prior application using a major proportion of the same resin particles used in the said prior application. Similarly, it has now been found possible to simply perform the processing steps of my prior application irrespective of whether or not the heat-softenable resin particles are non-water absorptive.

Through the utilization of a major weight proportion of resin, preferably at least 80% by weight of resin based on the total solids content of the coating, and most preferably through the use of resin in the substantial absence of any filler, the invention provides coatings of high gloss and transparency. These are especially useful in the overcoating of printed surfaces to enhance the gloss thereof. They are also useful as protective coatings in the wrapping of foods and the like. However, and unlike most protective coatings, the coatings of the invention are sufficiently thin, porous and uniform to provide very satisfactory print reception. In this regard very light coatings weighing about ½ to 1 pound per ream (3300 square feet of surface) can be used to enhance levelness and reduce ink hold out.

Apparently, drying factors are critically interrelated and, if properly controlled, as will be pointed out hereinafter, it is possible to obtain appropriate conditions of surface mobility and concentration and undersurface moisture plasticization even when the coating is totally devoid of filler to permit superior levelness, more uniform coating distribution and superior gloss to be obtained, just as these same factors were enhanced in my prior application, and without excessive sticking of the coating to the turning rolls. Similarly, the fact that the resin selected is water absorptive or even water soluble is no longer controlling. In general, more heat is needed than was adequate when sticking tendencies are reduced by the presence of a large proportion of mineral filler and the use of non-water absorptive resins, and control of temperature is more critical to avoid undesired adhesion to the rolls.

It is desired to indicate that the non-equilibrium moisture conditions which are required in accordance with the present development are critically interrelated. Starting with paper of ordinary and equilibrated moisture content and which can be characterized as relatively dry (frequently in the range of 2% to 13% and more frequently in the range of 5% to 10% by weight of water as a result of normal storage), there is deposited on the paper an aqueous coating typically containing from 50–70% by weight of water. As a result of this and under conditions of normal coating application, the surface of the paper which is being coated becomes saturated with water, though the water does not instantly penetrate the paper.

Heat is then applied to dry the coating. Under normal coating circumstance, the amount of water applied is not sufficient (if uniformly distributed) to render the paper soggy or wet to the touch. As heat is applied, the applied water partialy drains into the surface layer of the coating substrate and some of the surface water is evaporated. The surface temperature increases steadily at a relatively low rate of heat input which corresponds to the rapid vaporization of immediately available surface moisture. A sharp transition in this rate is noted at a surface temperature of approximately 160–170° F. where the rate of heat input required for a further rise in surface temperature increases rapidly. In accordance with the invention, heating must be continued until vaporization is sufficient to break the continuity of the film of water at the surface.

If this minimum removal of water is not exceeded, then the passage of the coated product through the nip of the turning or calendering rolls applying heat and pressure does not produce the result desired by the invention. First, there is a strong tendency for the coating to be picked off and to accumulate on the calender rolls. Secondly, when the coating is subjected to its brief contact with the calender rolls, the heat and pressure applied thereby tends to crush the paper substrate and to produce non-uniform surface characteristics.

There is also an upper limit to the heat drying of the coating which is reached at a temperature of about 195° F. which indicates a sharp reduction in the availability of water near the surface of the coating. By the time the surface temperature rises above 195° F., the effectiveness of the invention is reduced and the benefits of the invention are not effectively obtained. More specifically, water vapor plasticization is not obtained and the coverage and gloss of the product is impaired. Preferred surface temperatures are in the range of from 170–190° F. and heating is desirably rapid and completed in a period of less than 3.0 seconds, preferably less than 1.5 seconds and most preferably in less than 0.8 second.

Accordingly, and in accordance with the present invention, an aqueous coating composition comprising a major weight proportion of film-forming, heat softenable resin is applied to a surface of a relatively dry fibrous cellulosic paper substrate and the aqueous coating is exposed to an intense source of heat to rapidly dry the exposed surface of the coating, heating being continued until the surface temperature of the coating is in the range discussed hereinbefore. While the coated paper is in the critical non-equilibrium moisture condition specified, it is passed through the nip between a pair of turning rolls, at least one of which has a heated finishing surface so that heat, pressure and shearing forces are applied and the advantages of my prior application obtained, e.g., one obtains one or more of superior levelness, improved distribution, and superior gloss at lower coating weights.

If the paper sheet is dried beyond the point specified, the improved leveling and shear distribution of the coating is not obtained. Instead, the results degrade rapidly in the direction of conventional super calendering. Correspondingly, if drying has not proceeded to the point where the surface temperature is elevated above 160° F., then the coated film is not coherent and strong and tends to stick to the rolls and a cockled and uneven surface effect is obtained. Also, the pressure applied by the turning rolls, instead of leveling a specific portion of the paper, tends to merely crush the paper and the full glossing effect is not obtained.

In contrast, and when the water content of the coating is substantially confined to that portion of the substrate immediately underlying the coating, e.g., adjacent the interface between the coating and the substrate, permanent deformation of the substrate is largely confined to the water-plasticized portion underlying the coating to provide maximum leveling and gloss with minimal overall compression and without losing uniformity of effect or encountering roll sticking.

To relate the present invention to the usual situation, from 1 to 9 pounds per ream of coating on a dry basis is applied to a paper substrate weighing at least 20 pounds per ream with the coating being aqueous and having a total solids content of from 35–70% by weight, more frequently from 45–60% by weight, the balance being essentially water. Within this range of application of coating compositions, there is adequate water within the coating to provide the water-plasticization needed in the invention. On the other hand, and if desired, the aqueous coating compositions can be thinned to include a further proportion of water if needed.

To the extent that a previously applied cured coating remains heat-softenable, so that heat and pressure can render the resin binder mobile, rewetting is permissible as in my prior application.

It is important in the preferred practice of the present invention to regulate the heating operation so that the resin binder in the coating is concentrated with the bulk of the water removed by drainage and evaporation before the water in the paper substrate migrates deeply into the interior of the paper. The point is to confine water plasticization to that portion of the paper substrate which immediately underlies the applied coating. On this basis, it should be seen that the further we depart from equilibrium conditions in which the moisture content of the paper is uniformly distributed across its thickness, the more we are able to realize the advantages of the invention. When heating is continued for an excessive period of time, the surface temperature becomes excessive, surface moisture is reduced to an unacceptable level and the water within the paper substrate does not immediately underlie the applied coating which reduces the unique leveling effect obtained in the invention.

In view of the above considerations, the source of heat is preferably radiant and directed toward the coated substrate from the wet coated side thereof. Also, the heat should be sufficiently intense in order that the required drying is achieved by an exposure of less than about 3.0 seconds as aforesaid.

In the invention the critical non-equilibrium moisture conditions are identified by a surface temperature of the coated substrate as it emerges from the heating zone of from about 160° F. to about 195° F., as discussed hereinbefore. While the defined moisture conditions are essential, secondary factors which relate to the specific resin used influence which temperatures, within the range established by moisture conditions, are preferred. Thus, the composition of the resin, its film-forming characteristics, strength and tackiness and the like all influence the optimum operating temperature. Of a diversity of resins tested, all were well handled within the range of 170–190° F. and most of the resins provided their best results within the range of from 175–185° F.

While it is possible to apply the required heat from the opposite side of the wet coated paper, the total quality level is not as good and the coating coverage is not as good. Also, there is a somewhat greater tendency for the coated paper to stick to the turning rolls.

The fibrous cellulosic substrates to be coated in accordance with the invention can be of wide variety depending upon the use for which the product is intended. Thus they can be uncoated, coated, or sized webs, of either bleached or unbleached stocks, and can vary in weight from lightweight papers to heavier paperboards. For purposes of moisture drainage it is necessary that they be of a somewhat porous character. For example, paper which has simply been tubsized with an unpigmented starch or protein composition for increased internal strength provides a particularly suitable substrate for application of the coatings of this invention. Too, substrates which have previously been coated, whether the adhesive therein is water absorptive or not, can be used to advantage since the stock is partially filled in such that less coating need be applied by the process of the invention to achieve a visually continuous film. For magazine papers and the like where weight is of particular concern for reasons of economics, a comparatively lightweight stock of 45 pounds per ream or less can readily be coated by the method of this invention to provide a highly useful printing paper of minimum weight. It is to be understood that the term "fibrous cellulosic paper substrate" is inclusive of these non-woven substrates which are wholly cellulosic and those containing, in addition, non-cellulosic fibers, whether natural or synthetic.

Because of the relative high cost of the resin binder and owing to the nature of the leveling process, and also because one important aspect of the invention is the overcoating of pre-printed stock, it is desirable that low weights of coating be applied and, preferably, at high speeds. It has been found that there is little to be gained by the use of coating weights in excess of 9 pounds per ream dry and, for most purposes, 6.5 pounds per ream or less will satisfactorily provide the desired surface characteristics. In many instances, coatings or overcoatings of only 1 or 2 pounds per ream are quite useful.

With respect to the heat softenable resins which are used in the invention, several of these which are poorly absorptive of water are disclosed in my prior application, but it is desired to point out that the resin selected in the invention can be water absorptive, all that is required being that the resin should be softenable and rendered mobile and film-forming by the heat which is applied by the turning rolls under the conditions of moisture which have been specified. Polyvinyl acetate, copolymers of styrene and acrylic acid in weight proportions of 85/15, and carboxyl-containing copolymers of styrene and butadiene are all useful in the invention. Similarly, ammonium caseinate and polyvinyl alcohol are also useful. Thus, the invention is broadly applicable to diverse types of resins, including resins which are more aptly termed heat-softenable than thermoplastic because they acquire resistance to heat upon being heated.

The invention will be illustrated using unplasticized polyvinyl chloride resin particles which is a resin not normally handled as a thermoplastic resin because of its tendency to deteriorate at elevated temperature and because of its high glass transition temperature which necessitates, under ordinary circumstances, the utilization of very elevated temperatures in order to cause the particles thereof to coalesce. Still further, unplasticized polyvinyl chloride possesses notoriously poor flow under conditions of high temperature and pressure so that the use of polyvinyl chloride in a system which functions in shear at temperatures at or below the glass transition temperature is particularly startling and illustrative of the unique nature of the present invention.

In addition to polyvinyl chloride, which may be plasticized if desired, the invention can be followed with other resins of high glass transition temperature such as polyvinylidene chloride and copolymers thereof with vinyl chloride.

The heat applied under the conditions of moisture present effects an extensive softening of the heat softenable resin providing high mobility within the thin layer of coating material so that the shearing action of the turning rolls can effect a uniform distribution of the coating material over the paper and an extensive disruption and orientation of any particles of filler, especially dispersible mineral filler which may be present in minor amount. In this respect clay particles are of particular concern since the shearing forces disrupt these forming many clay platelets to cover the surface of the paper despite the minimum proportion of clay used and the minimum coating weight applied.

It is stressed that thermoplasticity is to be measured in the presence of water vapor since some resins, especially polyvinyl chloride used to illustrate the invention, which do not flow well under heat and pressure, have been found to flow quite well in the presence of water vapor as developed herein.

When filler is present, the filler is preferably a finely divided solid filler such as the mineral pigments or fillers, for example, clay, calcium carbonate, titanium dioxide, zinc oxide and the like. Mixtures of these can be employed with advantage.

In general, the temperature of the finishing roll should be in the range of 140° to 350° F. and the nip pressure in the range of 1500 to 7500 pounds per square inch. Particularly preferred, however, is the range of 3300 to 6000 pounds per square inch since this provides the greatest latitude in selecting the other process variables. Although nip pressures as great as 10,000 p.s.i. and as low as 500 p.s.i. can be tolerated, they require critical adjustments of other variables and hence are less satisfactory for maximum operating efficiency.

The speed of operation may vary considerably, speeds of 200 to 1000 or more lineal feet per minute being practicable. Normally, it is preferred to operate at speeds in excess of 400 lineal feet per minute, with speed being maximized with respect to the sophistication of the available equipment.

The coating material may be readily applied to the paper substrate by any of the conventional on-machine or off-machine procedures. It is preferred to use the coater in the nature of a doctoring device since this permits relatively low coating weights to be applied without substantial penetration of the paper stock.

After the paper has been coated and heat applied to provide the non-equilibrium moisture content previously referred to, thereby providing a sandwich type structure including a water-plasticized layer of paper adjacent the coating-paper interface, the coated paper is passed between the turning rolls. The coated side of the paper would normally be pressed into contact with an internally heated metal roll, preferably provided with a finishing surface such as polished chromium or the like. The turning rolls are driven at the same lineal speed as the coated substrate. The turning roll which is used as a backup is preferably formed to have an outer layer of material such as pressed cotton, nylon, asbestos or rubber which, although relatively hard has some resiliency in comparison with the finishing roll.

As will be understood, the turning rolls function to shear the coated surface of the paper and it is desired to point out that the invention emphasizes these shearing forces and, by virtue of the superior levelness achieved, the shearing forces are uniformly distributed over the surface of the paper.

It is preferred to employ a waxy lubricant in the coating composition in order to maintain on the finishing roll a surface having a minimum tendency to adhere to the coating which is applied to the paper substrate, but the use of a lubricant is not essential. In order that the finishing roll be able to pick up the lubricant from the coating composition, the lubricant should have a softening point below the surface temperature of the finishing roll. Desirably, the melting point of the lubricant should be in the range of 100° to 250° F. with the range of 140° to 200° F. being particularly preferred for effective high speed operations. Advantageously the lubricants are employed as aqueous emulsions of finely divided waxy material which, in comparison with the resin, is non-film forming. Particularly preferred materials are those of a polar character such as the high melting sugar cane waxes and oxidized hydrocarbon waxes which appear to form an adherent physical or chemical bond with the finishing surface to provide a more stable layer of lubricant.

For effective utilization of a lubricant, it should in general constitute about 0.5 to 15% by weight of the total solids content of the coating.

Aside from the hereinbefore described ingredients of the aqueous coating compositions, namely the particulate filler, resin and lubricant, it is entirely practical and often desirable to include certain additives, for example dyes, plasticizers, viscosity regulators, dispersants for the lubricant, etc.

The invention will be more fully understood from the accompanying drawings in which:

FIG. 1 is a diagrammatic view illustrating the process of the invention; and

FIG. 2 is a diagrammatic sectional view on an enlarged scale of the product produced in FIG. 1.

Referring more particularly to FIG. 1 which illustrates the steps of the invention, a paper substrate 11 is conveyed from an unwind roll 10 past guide rolls 12 and 13 to a coating device 14 which comprises an applicator roll 15, turning in either direction as desired, dipping in a pan 16 containing aqueous coating 17. A rubber backup roll 18 is used to insure intimate contact with a doctor 19 constituted by a ¼" rotating rod to remove excess coating and return it to the pan 16.

The substrate 11 with its undersurface coated with a thin layer of coating is then passed via guide rolls 22 through a heating zone constituted by a radiant heating device 20 positioned beneath the substrate. The heater 20 may be electric or gas-fired, but it is desirably formed in sections which can be turned on and off, as desired so that, and especially in conjunction with accurate control of speed, the precise control of temperature required by the invention can be obtained. The reflector 21 is optional, but is helpful to minimize heat requirements.

On leaving the heating zone, the coated substrate passed guide roll 22 and then proceeds to the calender stack 23 consisting of hydraulically loaded rolls lying between king and queen rolls 24. On the way, surface temperature may be measured continuously or periodically by an infrared pyrometer 25 which is positioned about 20 inches down stream from the heating unit 20 and held in close proximity to the heated surface and directly facing the same so that the surface temperature can be directly observed without interference.

The surface temperature reading may be used to either automatically or manually adjust the operation of the equipment in order that the partially dried coating possess the non-equilibrium moisture conditions found to be critical. One may adjust line speed, heating rate or coating weight and automatic control would be used wherever economically justified.

The coated and heated substrate in its non-equilibrium condition is then passed between the nip formed by the rolls 26 and 27 in the calender 23. In the preferred operation, several successive heat and pressure nips are used, three being shown, fly rolls 28 being used to guide the paper between the successive nips.

Finally, the finished paper is led to a wind-up roll 29.

FIG. 2 shows a cross-section of the product which is produced in accordance with the invention. This product is constituted by a cellulosic substrate 30 and a thin layer of coating material 31. In the usual situation, the weight of coating material is insufficient to fill the surface volume of the paper substrate prior to treatment in accordance with the invention, e.g., as it leaves the unwind roll 10. However, and in the product of the invention, the upper portion 32 of the substrate 30 is densified and is greatly leveled so that the small amount of coating 31 is able to cover the same. This densification is illustrated in the diagrammatic sketch by the absence of voids 33 from the densified layer 32 despite the fact that such voids are indiscriminately distributed throughout the remainder of the substrate 30. Not seen in FIG. 2 is the fact that the shearing forces developed in the nip cause a considerable orientation of any mineral pigment portion of the coating so that, in addition to the levelness and uniform distribution of coating material which is achieved, greater gloss is also obtained and, as shown in the drawing, the coating is not driven into surface voids in the paper as a result of the densification and leveling referred to.

It is desired to point out that the coated substrate is preferably passed directly into the nip between the turning rolls 26 and 27. Apparently, passage directly into the nip tends to promote a greater relative slip within the underlying portion of the coating and plasticized portion of the substrate 32 with the consequence that the materials thereof are exposed to a greater shearing force and, hence, greater leveling action. Such a shearing force is not as effectively provided if the substrate wraps about a significant portion of the circumference of either of the nip rolls prior to entry into the nip itself.

In FIG. 1 the roll 26 is an internally heated metal roll provided with a finishing surface and the roll 27 has a hard but resilient surface of one or more of the materials mentioned earlier for a roll used as a backup roll. In the examples which follow, the heated rolls 26 have a polished chromium surface and the backup rolls 27 has a pressed cotton surface.

Although the process has mainly been described with reference to an off-machine application as would be conveniently performed on a supercalender, it will be apparent that for increased economical advantages the method is readily adapted to an on-machine operation. In still other modifications it is entirely practical and, in fact, desirable for higher production to increase materially the width of the nip by employing nip rolls of a diameter beyond the ordinary size of 8 to 20 inches. Alternatively, the finishing roll alone may be increased in size.

The infrared pyrometer is used by holding it within about ½ inch of the heated paper surface and is shielded to reduce interference from stray radiant sources. The device is calibrated against paper pressed against an oil bath at known temperature within the range of from 150–250° F. The pyrometer used in the examples which follow is equipped with a Siemens head identified by the nomenclature "Ardonex 30–200" and is connected to a Foxboro recorder.

The invention is illustrated in the examples which follow:

*Example 1*

A tubsized paper stock weighing 62 pounds per ream is coated with 6 pounds per ream of an aqueous coating composition containing 50% by weight of emulsion polymerized unplasticized polyvinyl chloride particles providing an aqueous latex. The coated paper is dried to a surface temperature of 180° F. in about 1.0 second and then passed through three nips using a pressure of 800 pounds per lineal inch. The finishing rolls are chrome plated and heated with steam at 25 p.s.i.g. (which provides a temperature at the surface of the finishing rolls of 225–250° F.). The sheet is moved through the calender rolls at a speed of 400 feet per minute to provide a gloss reading of 59.

The above example indicates successful operation utilizing polyvinyl chloride but it will be understood that this resin is notoriously intractable and difficult to work with and requires very precise control of temperature, e.g 175–195° F. is broadly operable and 175–185° F. is best. Below 175° F., a tendency to deposit material on the calender rolls is experienced. Utilizing temperatures in excess of 195° F., the leveling and gloss fall off and become less acceptable.

With less intractable resin, such as polyvinyl acetate, lower surface temperatures down to about 160° F. can be used satisfactorily. Also, and because polyvinyl acetate softens much more easily than polyvinyl chloride, a lower finishing roll surface temperature is preferred, e.g., 200° F.

*Example 2*

The above example is repeated using the commercial latex Dow 700 to provide the polyvinyl chloride particles. As is known, this latex is a typical non-plasticized dispersion grade polyvinyl chloride resin available containing 50% by weight of dispersed resin. The same results are obtained.

*Example 3*

Example 2 is repeated, with the addition of 12% of the weight of the latex, of polyvinyl chloride powder having an average particle size of 2 microns. A heavier film is formed.

*Example 4*

A tubsized paper stock weighing 62 pounds per ream is coated with ½ pound to 1 pound per ream of a 12.5% by weight aqueous solution of ammonium caseinate. The coated paper is dried to a surface temperature of 160° F. and processed as in Example 1 to provide a gloss reading of 35–40. The levelness of the paper was improved as was its ink hold out capacity.

*Example 5*

Example 4 was repeated using a 7.3% by weight aqueous solution of polyvinyl alcohol in place of the 12.5% by weight aqueous solution of ammonium caseinate used in Example 4. Similar results were obtained with a somewhat higher gloss reading being obtained. The exceptional mobility of polyvinyl alcohol made it desirable to slightly lower the temperature used.

The invention is defined in the claims which follow.

I claim:

1. A method for the continuous production of coated paper to obtain one or more of superior levelness, improved coating distribution and superior gloss at lower coating weights, comprising providing a dry fibrous cellulosic paper substrate having on one surface thereof, a water-wet layer of film-forming material consisting essentially of heat softenable resin, said resin constituting the major weight proportion of the total solids content of said layer, rapidly heating said wet layer on said paper substrate until the exposed surface of the coated paper has a surface temperature in the range of from about 160° F. to about 195° F., so that vaporization of immediately available surface water is sufficient to break the continuity of the film of water at the surface without unduly reducing the availability of water near the surface of the coating whereby the water content of said wet layer is substantially confined to that portion of said substrate immediately underlying said layer, and passing said paper substrate in the non-equilibrium moisture condition specified through the nip between a pair of turning rolls, at least one of which has a heated finishing surface, with said layer in contact with said finishing surface, said turning rolls applying sufficient heat and pressure to soften said resin and to shear said layer to distribute the same and selectively densify the portion of said substrate underlying said layer to provide the desired coated paper.

2. A method as recited in claim 1 in which said wet layer consists essentially of at least 80% by weight of said resin, with the balance of said layer comprising mineral filler.

3. A method as recited in claim 1 in which said resin is constituted by particles of unplasticized polyvinyl chloride.

4. A method as recited in claim 1 in which said layer is present in an amount up to 9 pounds dry per 3300 square feet of surface.

5. A method as recited in claim 1 in which said substrate with the wet layer thereon is heated for a period of less than 3 seconds.

6. A method as recited in claim 1 in which said wet layer is heated radiantly from the side of said substrate surfaced with said layer.

7. A method as recited in claim 1 in which at least one of said rolls has a finishing surface heated to a temperature within the range of 190° to 350° F., with said layer passing through said nip in contact with said finishing surface, said turning rolls applying heat and a pressure at the nip of about 1500 to 7500 p.s.i.

8. A method as recited in claim 7 in which said finishing surface is polished chromium having a molten deposit of waxy material thereon, said deposit being replenished from waxy material contained within the said layer in an amount of about 0.5 to 15%, on a dry weight basis.

9. A method as recited in claim 1 in which said layer contacts the said finishing surface substantially only within said nip and wherein the coated paper is immediately withdrawn from contact with said finishing roll upon emerging from said nip.

10. A method as recited in claim 1 in which said wet layer includes up to 20% by weight of total solids of mineral filler.

11. A method as recited in claim 10 in which said mineral filler is clay.

12. A method as recited in claim 1 in which said exposed surface of the coated paper is heated to a temperature in the range of from 170–190° F.

13. A method for the continuous production of coated paper having a finished print-receptive surface comprising providing a dry fibrous cellulosic paper substrate having on one surface thereof, a water-wet layer of film-forming material consisting essentially of heat-softenable resin, said resin constituting at least 80% by weight of the total solids content of said layer, said wet layer being deposited in an amount to provide from 1 to 9 pounds dry per 3300 square feet of surface, rapidly heating said wet layer on said paper substrate to heat the exposed surface of the coated paper to a surface temperature in the range of from about 160° F. to about 195° F. in a period of up to 3.0 seconds, so that vaporization of immediately available surface water is sufficient to break the continuity of the film of water at the surface without unduly reducing the availability of water near the surface of the coating whereby the water content of said wet layer is substantially confined to that portion of said substrate immediately underlying said layer, and passing said paper substrate in the non-equilibrium moisture condition specified through the nip between a pair of turning rolls, at least one of which has a heated finishing surface, with said layer in contact with said finishing surface, said turning rolls applying sufficient heat and pressure to soften said resin and to shear said layer to distribute the same and provide a glossed print-receptive surface coating which is securely bonded to the said substrate.

14. A method for the continuous production of coated paper having a finished print-receptive surface comprising the steps of:

(A) applying to a fibrous cellulosic paper substrate having a moisture content of from 2–13% and weighing at least 20 pounds per ream, a layer of aqueous coating consisting essentially of up to 20% by weight of finely divided solid mineral filler in intimate admixture with film-forming, heat-softenable resin, said resin constituting at least 80% by weight of the total solids content of said layer, said coating being applied in an amount to deposit from 1 to 9 pounds per ream of dry coating weight;

(B) rapidly heating said wet layer on said paper substrate to heat the exposed surface of the coated paper to a surface temperature in the range of from 170–190° F. in a period of up to 1.5 seconds, so that vaporization of immediately available surface water is sufficient to break the continuity of the film of water at the surface without unduly reducing the availability of water near the surface of the coating whereby the water content of said wet layer is substantially confined to that portion of said substrate immediately underlying said layer; and (C) passing the resultant coated substrate in the non-equilibrium moisture condition specified through the nip between a pair of turning rolls, at least one of said rolls having a finished surface heated to a temperature within the range of 190–350° F., said layer passing through said nip in contact with said finishing surface, said turning rolls applying a pressure at the nip of at least 500 p.s.i.

15. A method as recited in claim 14 in which said aqueous coating has a total solids content of from 35–70% by weight.

16. Coated paper having a finished print-receptive surface comprising a fibrous cellulosic substrate having bonded to at least one surface thereof a visually continuous, print-receptive film consisting essentially of film-forming, heat-softenable resin constituting the major weight proportion of said film, said resin constituting the essential agent securing said film to said substrate, and said coated paper being permanently pressure deformed with the permanent deformation of the substrate being largely confined to the portion thereof underlying said film to provide maximum leveling with minimum overall compression.

17. The product of claim 16 in which said film is present in an amount up to 6.5 pounds per 3300 square feet.

References Cited
UNITED STATES PATENTS

| | | | |
|---|---|---|---|
| 2,321,938 | 6/1943 | Quinn | 117—60 |
| 2,346,624 | 4/1944 | Straus | 117—64 |
| 2,554,663 | 5/1951 | Cowgill | 117—65.2 |
| 2,826,827 | 3/1958 | Metz | 117—64 X |
| 2,919,205 | 12/1959 | Hart | 117—64 |
| 3,028,258 | 4/1962 | Rice | 117—64 |

WILLIAM D. MARTIN, *Primary Examiner.*

H. W. MYLIUS, M. LUSIGNAN, *Examiners.*